United States Patent [19]
Yamazaki et al.

[11] Patent Number: 5,788,381
[45] Date of Patent: Aug. 4, 1998

[54] ROTARY SHAFT LUBRICATING STRUCTURE

[75] Inventors: Masakazu Yamazaki; Fuminori Kawashima; Chiharu Shimizu; Kensuke Nakamura; Nobuyoshi Takamatsu; Toru Kano; Tomoki Okita; Hideo Ueshima, all of Wako, Japan

[73] Assignee: Honda Giken Kogyo Kabushiki Kaisha, Tokyo, Japan

[21] Appl. No.: 795,276

[22] Filed: Feb. 4, 1997

[30] Foreign Application Priority Data

Feb. 6, 1996 [JP] Japan .................. 8-020298

[51] Int. Cl.$^6$ .............. F16F 15/26; F16C 33/66
[52] U.S. Cl. .............. 384/400; 123/192.2; 384/286
[58] Field of Search .............. 384/286, 287, 384/291, 322, 397, 400, 403; 123/192.2, 196 R

[56] References Cited

U.S. PATENT DOCUMENTS

| 2,891,483 | 6/1959 | Murray et al. | 384/291 X |
| 4,033,312 | 7/1977 | Howe | 123/196 R |
| 4,258,673 | 3/1981 | Stoody, Jr. et al. | 384/322 X |
| 4,699,575 | 10/1987 | Geisel et al. | 384/400 X |
| 4,766,857 | 8/1988 | Laine et al. | 123/192.2 |
| 5,305,656 | 4/1994 | Kamiya et al. | 123/192.2 X |
| 5,535,643 | 7/1996 | Garza | 123/192.2 X |

FOREIGN PATENT DOCUMENTS

| 2 298 004 | 8/1976 | France . |
| 64-3847 | 2/1989 | Japan . |
| 5-321982 | 12/1993 | Japan . |
| 6-017879 | 1/1994 | Japan . |

Primary Examiner—Thomas R. Hannon
Attorney, Agent, or Firm—Armstrong, Westerman, Hattori, McLeland & Naughton

[57] ABSTRACT

An engine has two balancer shafts supported on two bearing bushings which are made of the same material and mounted to a balancer holder. Lubricating oil passages for supplying oil to the bearing bushings are defined offset upwards from the centers O of the bearing bushings and by a distance δ. Each of the bearing bushings has two oil bores having a center angle θ other than 180°. The two oil bores in the bearing bushing of one balancer shaft communicate with the lubricating oil passage, and one of the oil bores in the bearing bushing of another balancer shaft communicates with the lubricating oil passage, while the other oil bore of that another balancer shaft is closed to keep out of the lubricating oil passage. Thus, downstream ends of the lubricating oil passages for supplying the oil to the bearing bushings of the plurality of rotary shafts can be closed without use of a special closing member such as a blind plug.

9 Claims, 12 Drawing Sheets

1

ROTARY SHAFT LUBRICATING STRUCTURE

BACKGROUND OF THE INVENTION

1. Field of the Invention

The present invention relates to a rotary shaft lubricating structure for lubricating a plurality of rotary shafts by supplying oil from an upstream side to a downstream side of a lubricating oil passage defined in a bearing block, the rotary shafts being supported respectively in a plurality of annular bearing members which have first and second oil bores at locations spaced apart from one another through a predetermined angle and which are fixed in a plurality of bearing bores defined in the bearing block, the lubricating oil passage passing through the bearing bores.

2. Description of the Related Art

Such a rotary shaft lubricating structure is already known from Japanese Utility Model Publication No. 64-3847. In the structure described in this publication, first and second bearing members (bushings) for supporting journal portions of first and second balancer shafts have different shapes. The first bearing member located upstream of the lubricating oil passage (i.e., lubricating oil supply passage) has two oil bores communicating with the lubricating oil passage, and the second bearing member located downstream of the lubricating oil passage has a single oil bore communicating with the lubricating oil passage. Therefore, the oil supplied from the upstream side of the lubricating oil passage passes through the two oil bores of the first bearing member to lubricate the journal portion of the first balancer shaft and then passes through the single oil bore of the second bearing member to lubricate the journal portion of the second balancer shaft. At this time, the downstream end of the lubricating oil passage is closed by the second bearing member having the single oil bore and hence, it is unnecessary to close the downstream end of the lubricating oil passage by a special blind plug, leading to a reduced number of parts.

However, the above known structure suffers from a disadvantage in that the shapes (the number of the oil bores) of the first and second bearing members must differ from each other, resulting in an increased number of types of parts, which require an increase in both manufacturing and management costs.

SUMMARY OF THE INVENTION

Accordingly, it is an object of the present invention to ensure that the downstream end of the lubricating oil passage can be closed by a single type of bearing member without using a special closing member such as a blind plug.

To achieve the above object, according to the present invention, there is provided a rotary shaft lubricating structure for lubricating a plurality of rotary shafts by supplying an oil from an upstream side to a downstream side of a lubricating oil passage defined in a bearing block passing through a plurality of bearing bores, the rotary shafts being supported respectively in a plurality of annular bearing members which have first and second oil bores at locations spaced apart from one another through a predetermined angle and which are fixed in the plurality of bearing bores defined in the bearing block, wherein the first and second oil bores in the remaining bearing members excluding the downstream end-side bearing member located at a downstream end in an oil supplying direction open into the lubricating oil passage; the upstream oil bore in the downstream end-side bearing member opens into the lubricating oil passage, and the downstream oil bore is closed by the bearing block to keep out the lubricating oil passage.

With such an arrangement, the downstream end of the lubricating oil passage can be closed without using a special closing member only by preparing the plurality of bearing members having the same shape and by setting the angle of fixing of the downstream end-side bearing member located at the downstream end portion in the oil supplying direction, so that the angle is different from those of the other bearing members, thereby reducing the number of parts. Moreover, it is unnecessary to manufacture a plurality of types of bearing members having different shapes, which can contribute to a reduction in cost. Further, when the bearing members are fixed at different angles, it is not restricted or hindered by the bearing bores in the bearing block, leading to an enhanced case of assembly.

The above and other objects, features and advantages of the invention will become apparent from the following description of the preferred embodiments taken in conjunction with the accompanying drawings.

BRIEF DESCRIPTION OF THE DRAWINGS

FIGS. 1 to 10 illustrate a first embodiment of the present invention, wherein

FIG. 1 is vertical sectional view of an engine;

FIG. 2 is a sectional view taken along a line 2—2 in FIG. 1;

FIG. 3 is a view taken in a direction of an arrow 3 in FIG. 2;

Figure 2:
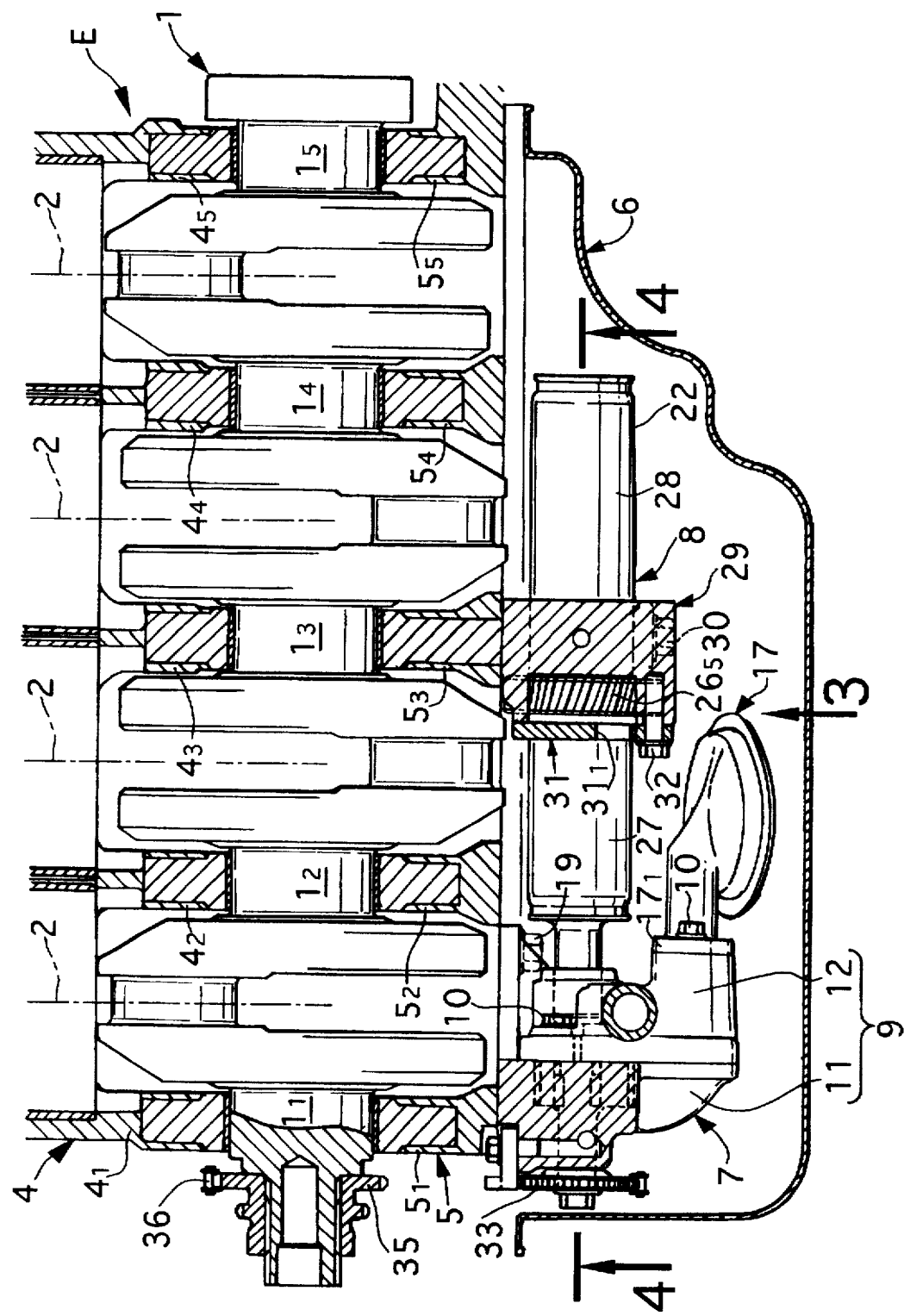
Figure 4:
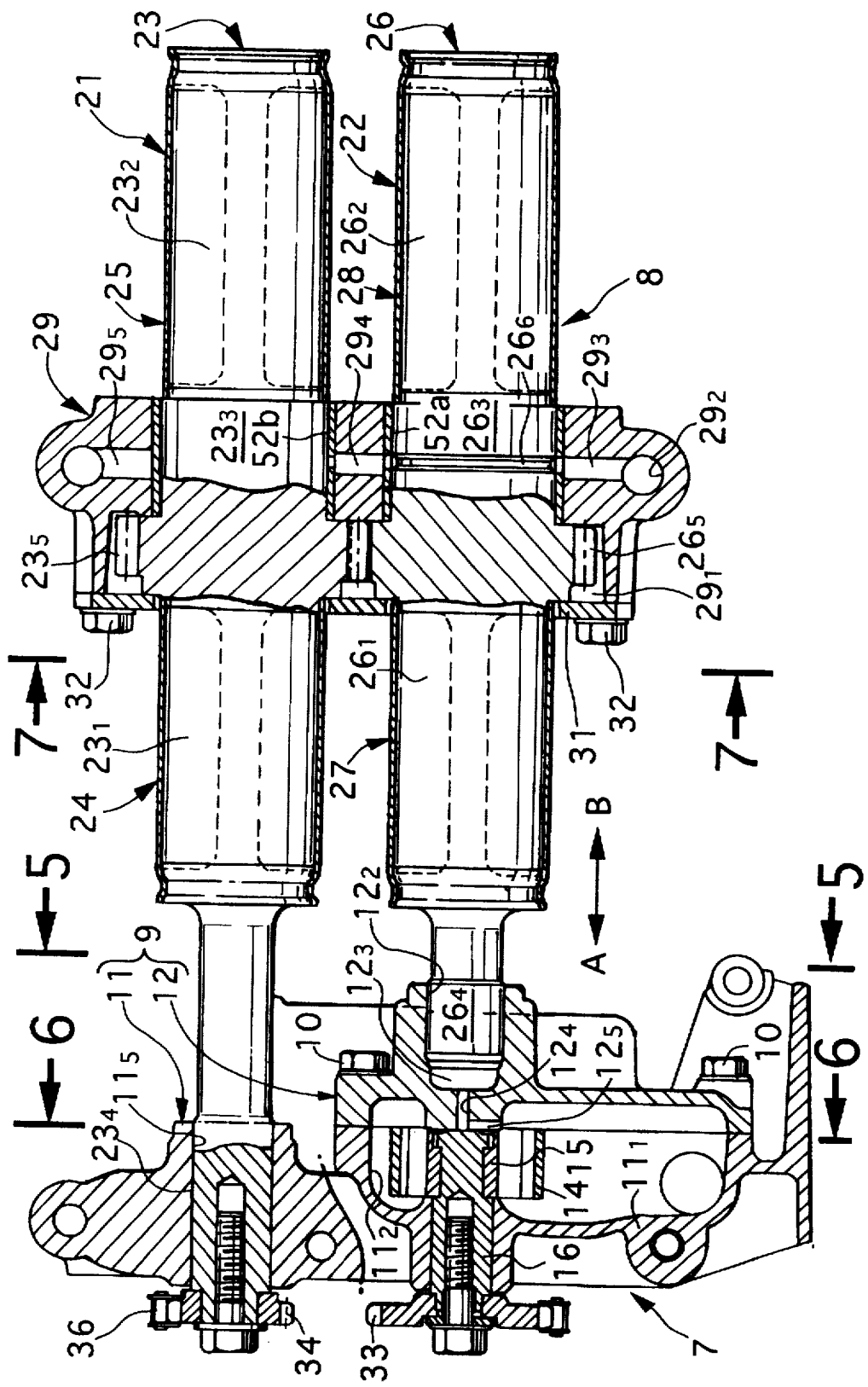
Figure 5:
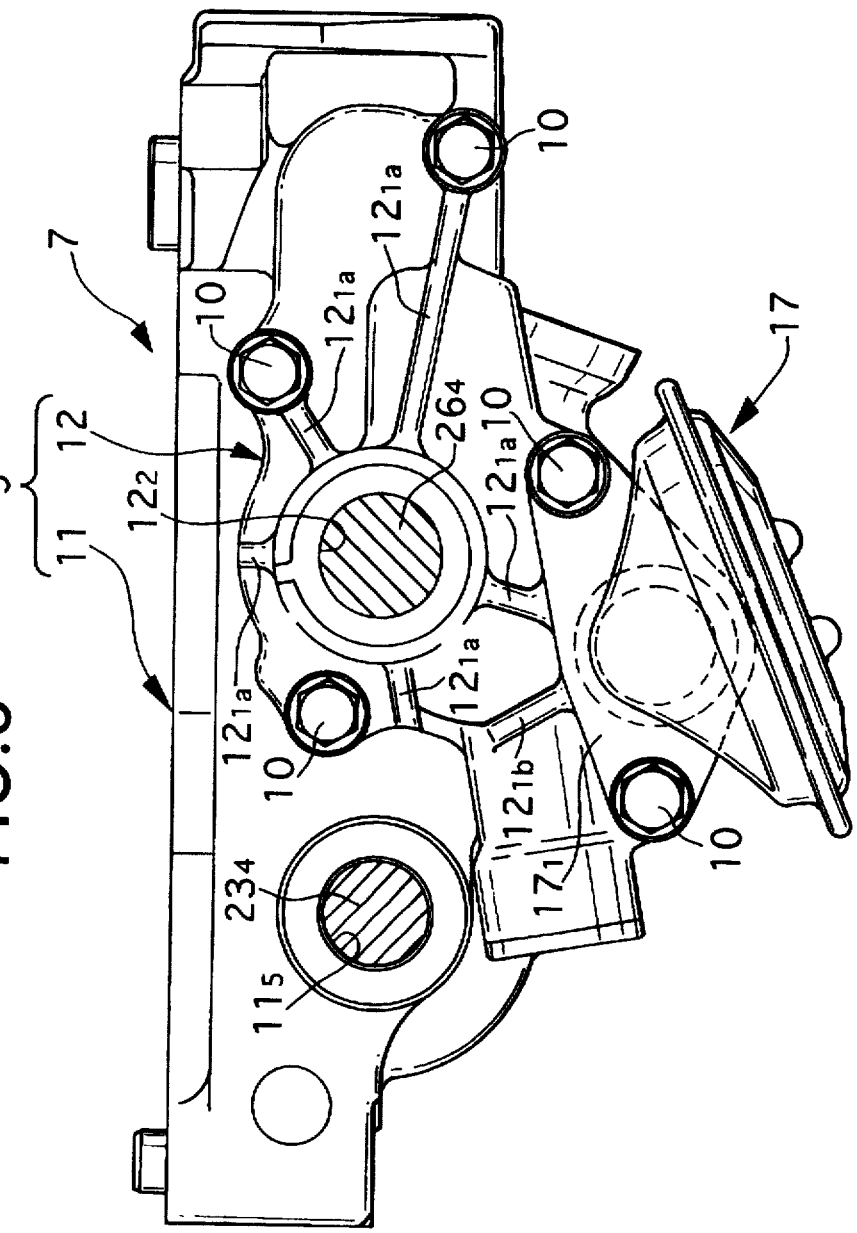
Figure 6:
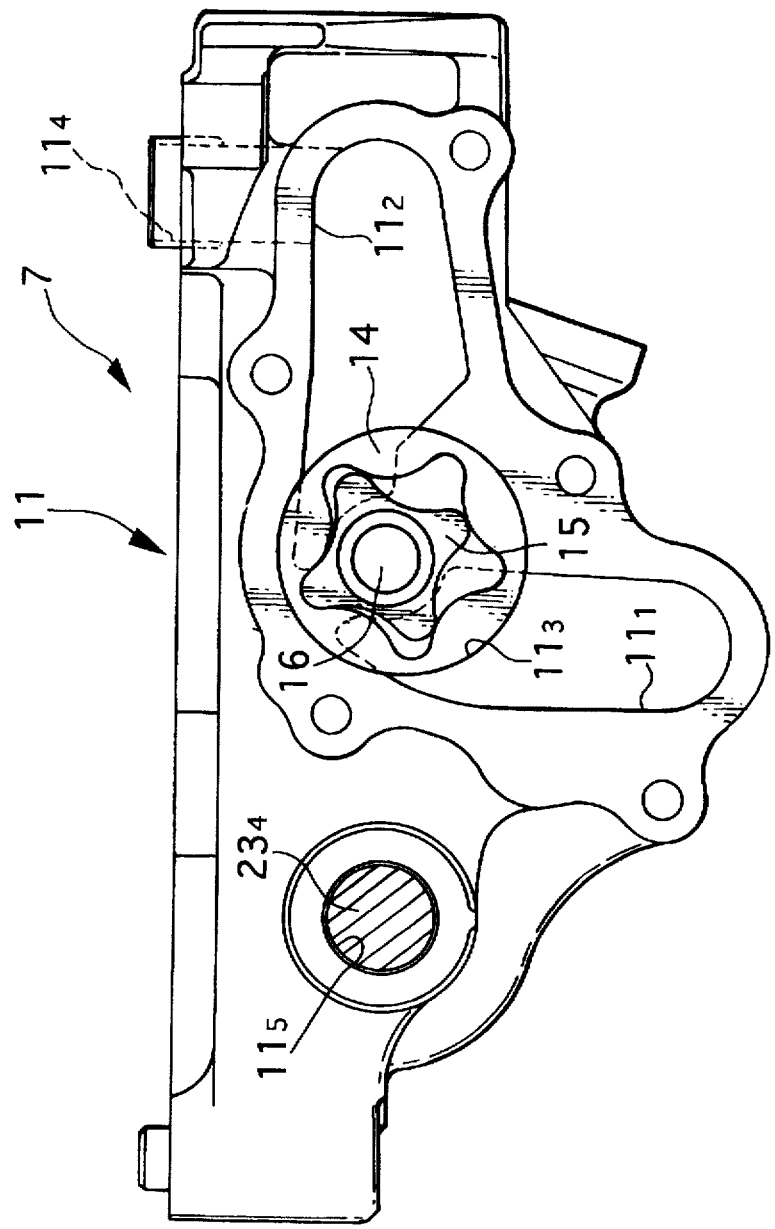
Figure 7:
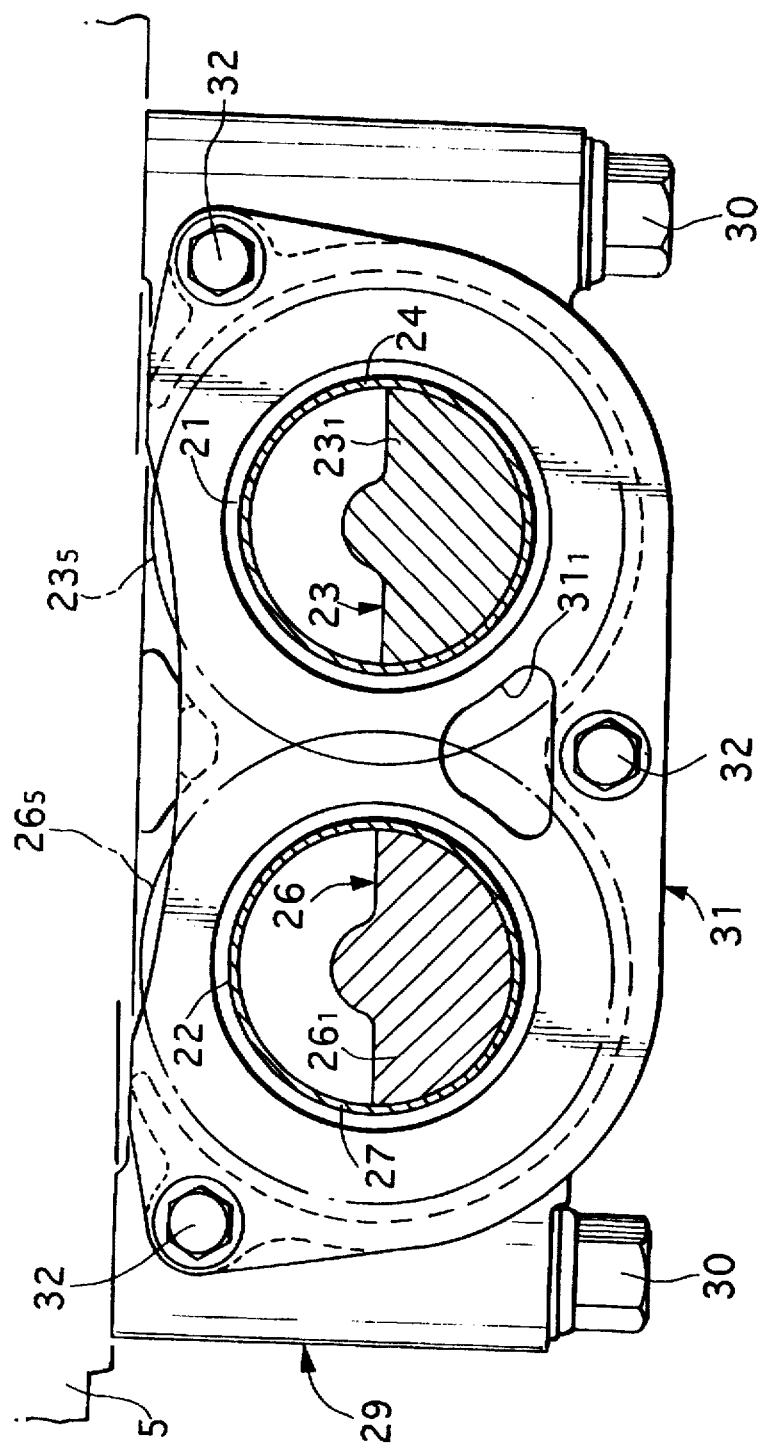
Figure 8:
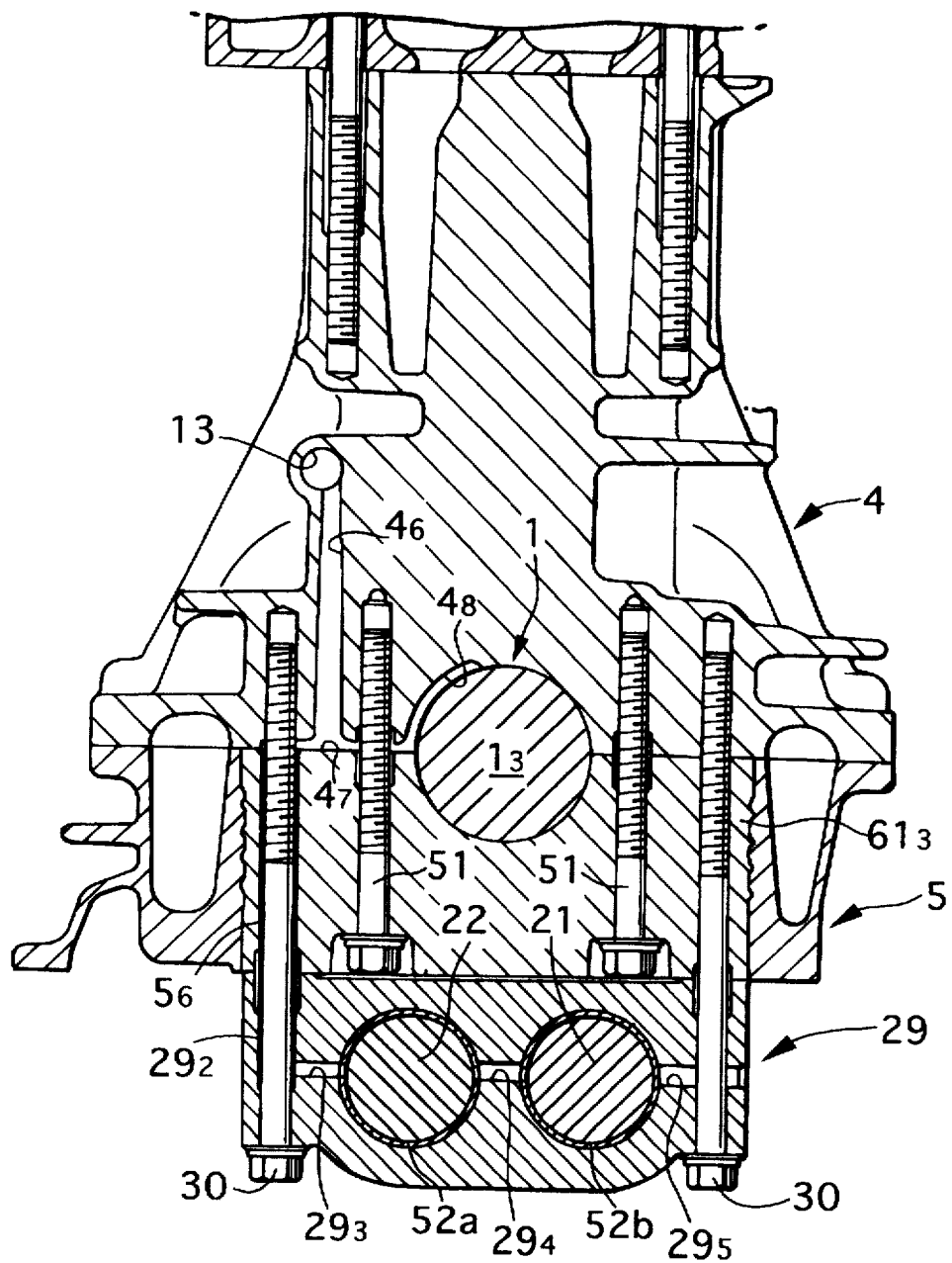
Figure 9:
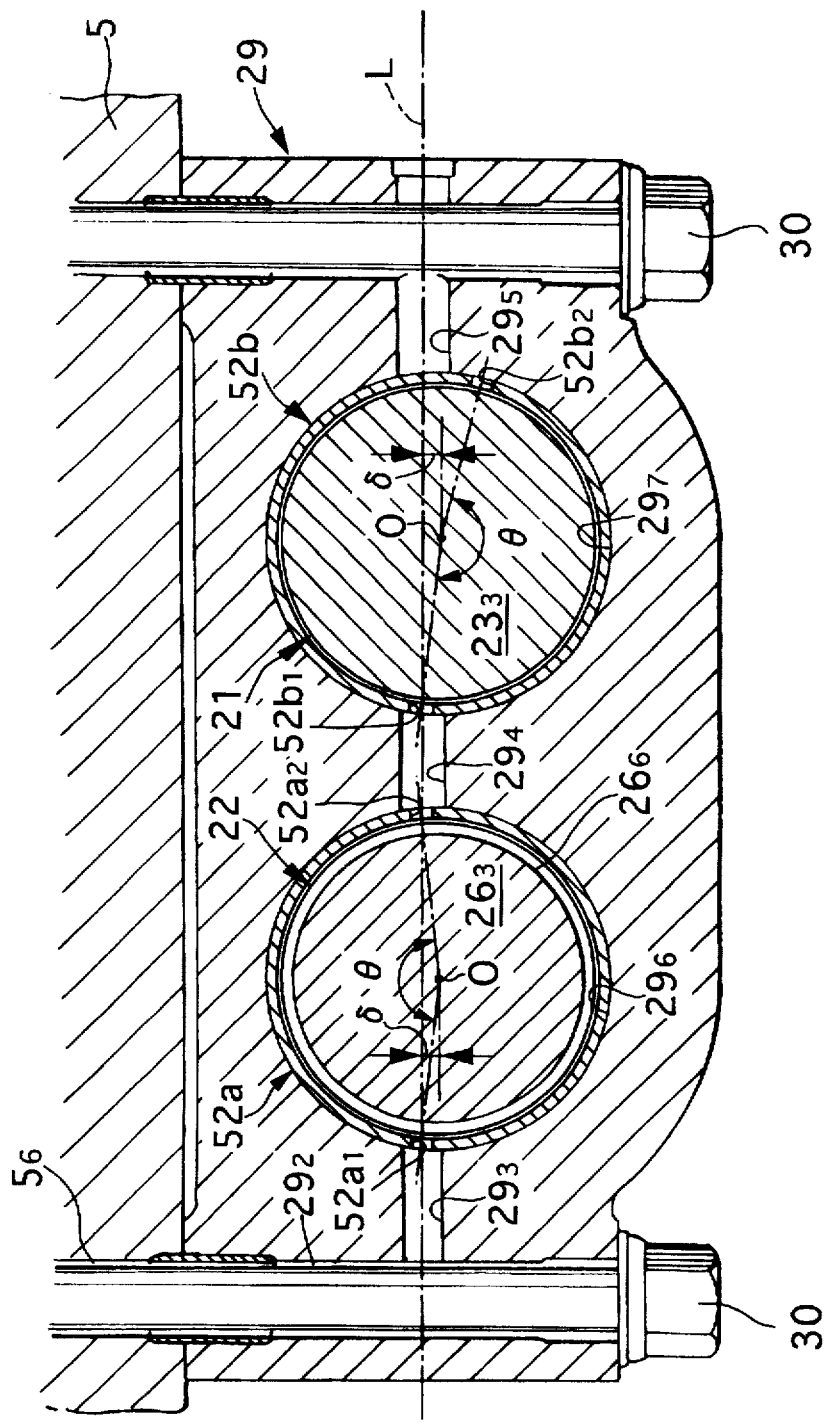
Figure 10:
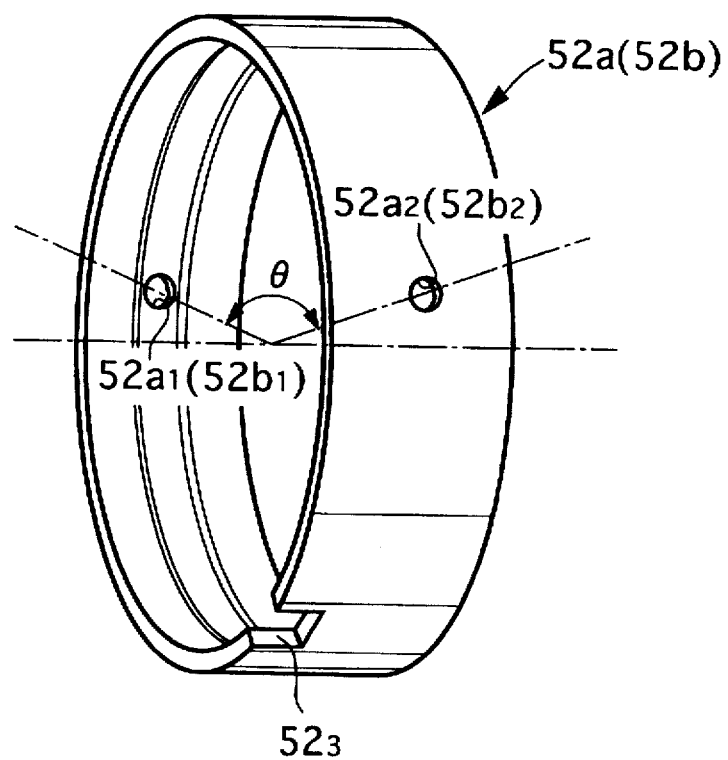
Figure 11:
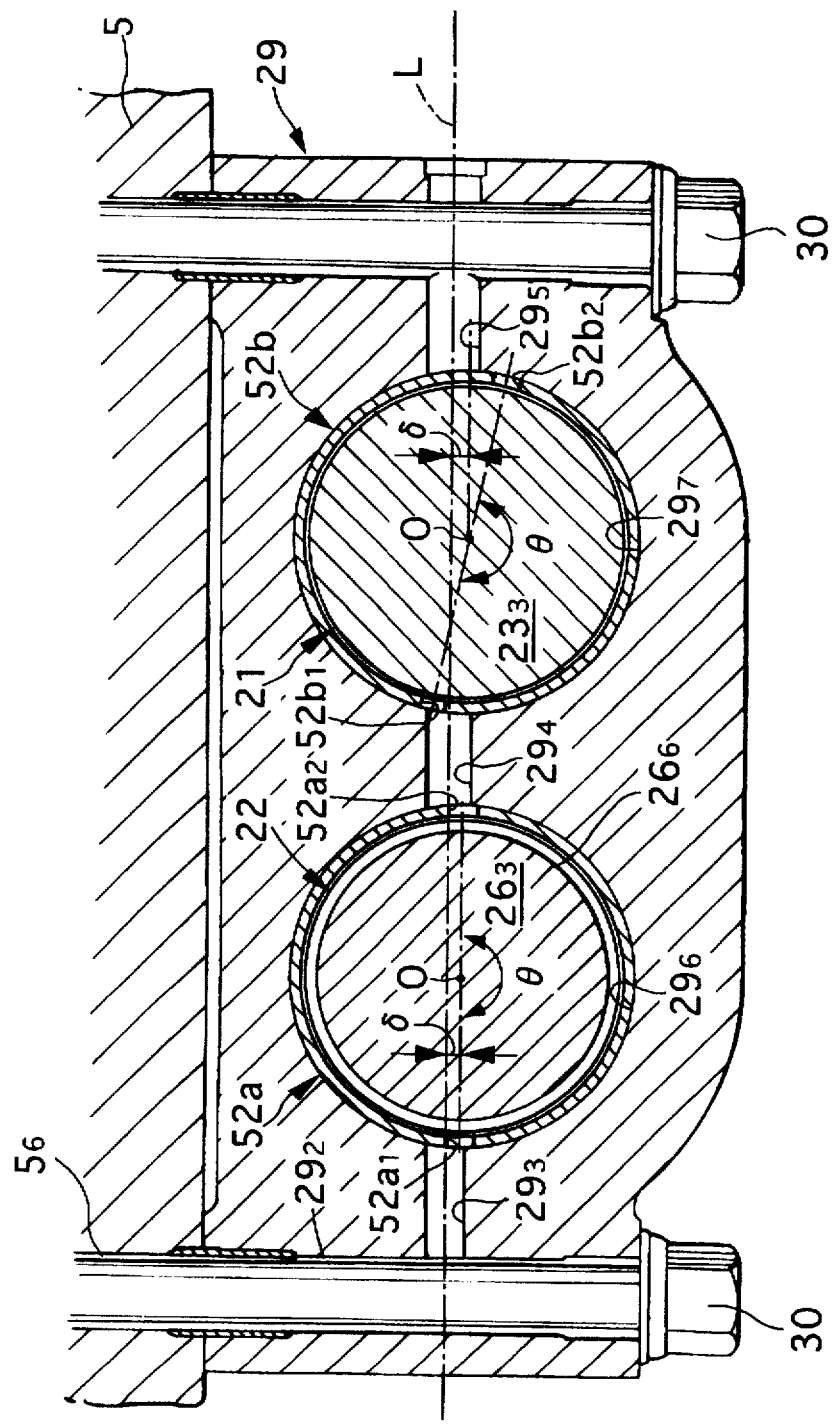
Figure 12:
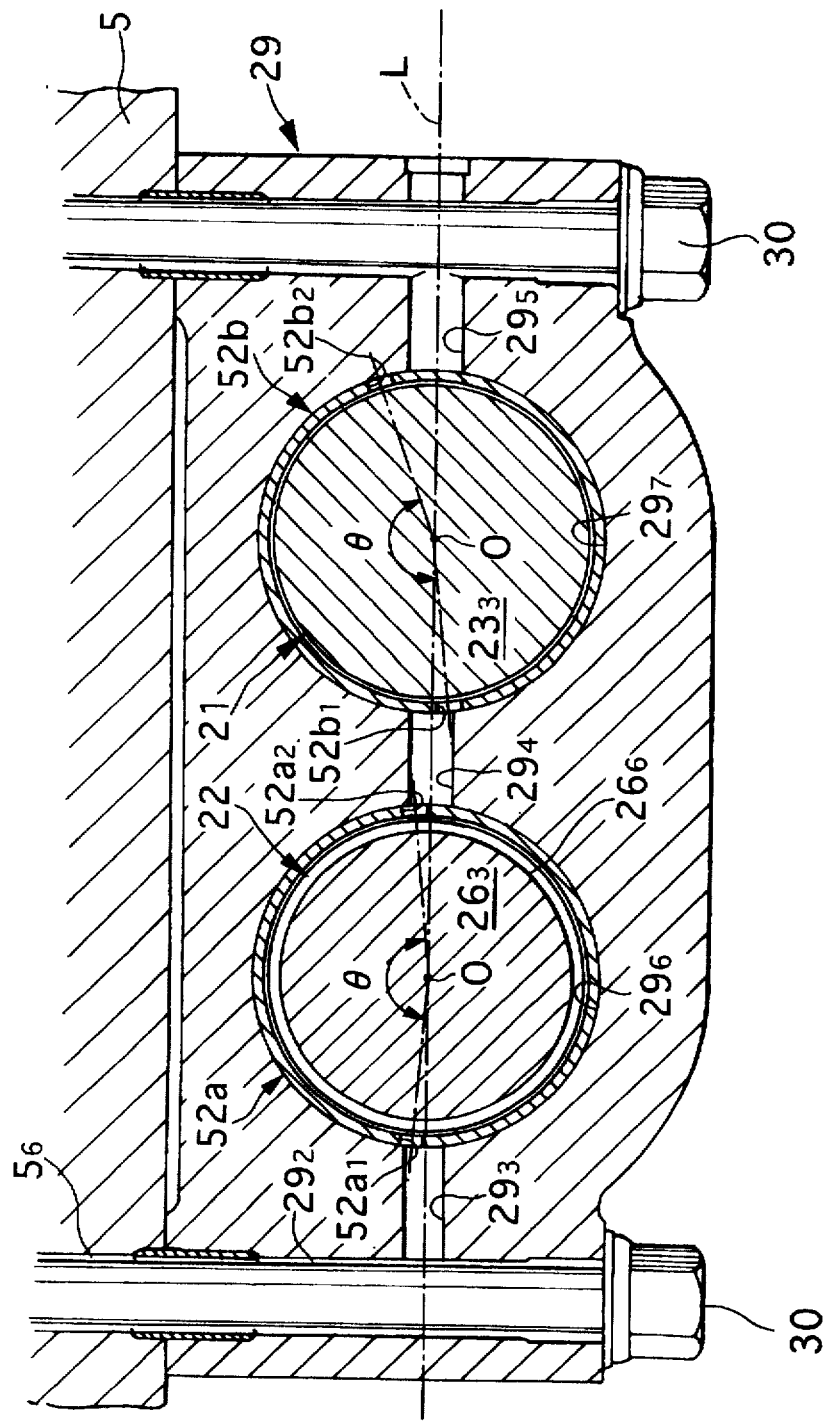

FIG .4 is an enlarged view (a bottom view of a secondary balancer device) taken along a line 4—4 in FIG. 2;

FIG. 5 is a sectional view taken along a line 5—5 in FIG. 4;

FIG. 6 is a sectional view taken along a line 6—6 in FIG. 4;

FIG. 7 is an enlarged sectional view taken along a line 7—7 in FIG. 4;

FIG. 8 is a sectional view taken along a line 8—8 in FIG. 2;

FIG. 9 is an enlarged view of an essential portion in FIG. 8;

FIG. 10 is a perspective view of a bearing bushing;

FIG. 11 is a view corresponding to FIG. 9, but according to a second embodiment of the present invention; and FIG. 12 is a view corresponding to FIG. 9, but according to a third embodiment of the present invention.

DESCRIPTION OF THE PREFERRED EMBODIMENTS

The present invention will now be described by way of preferred embodiments with reference to the accompanying drawings.

A first embodiment of the present invention will be first described with reference to FIGS. 1 to 10.

Figure 1:
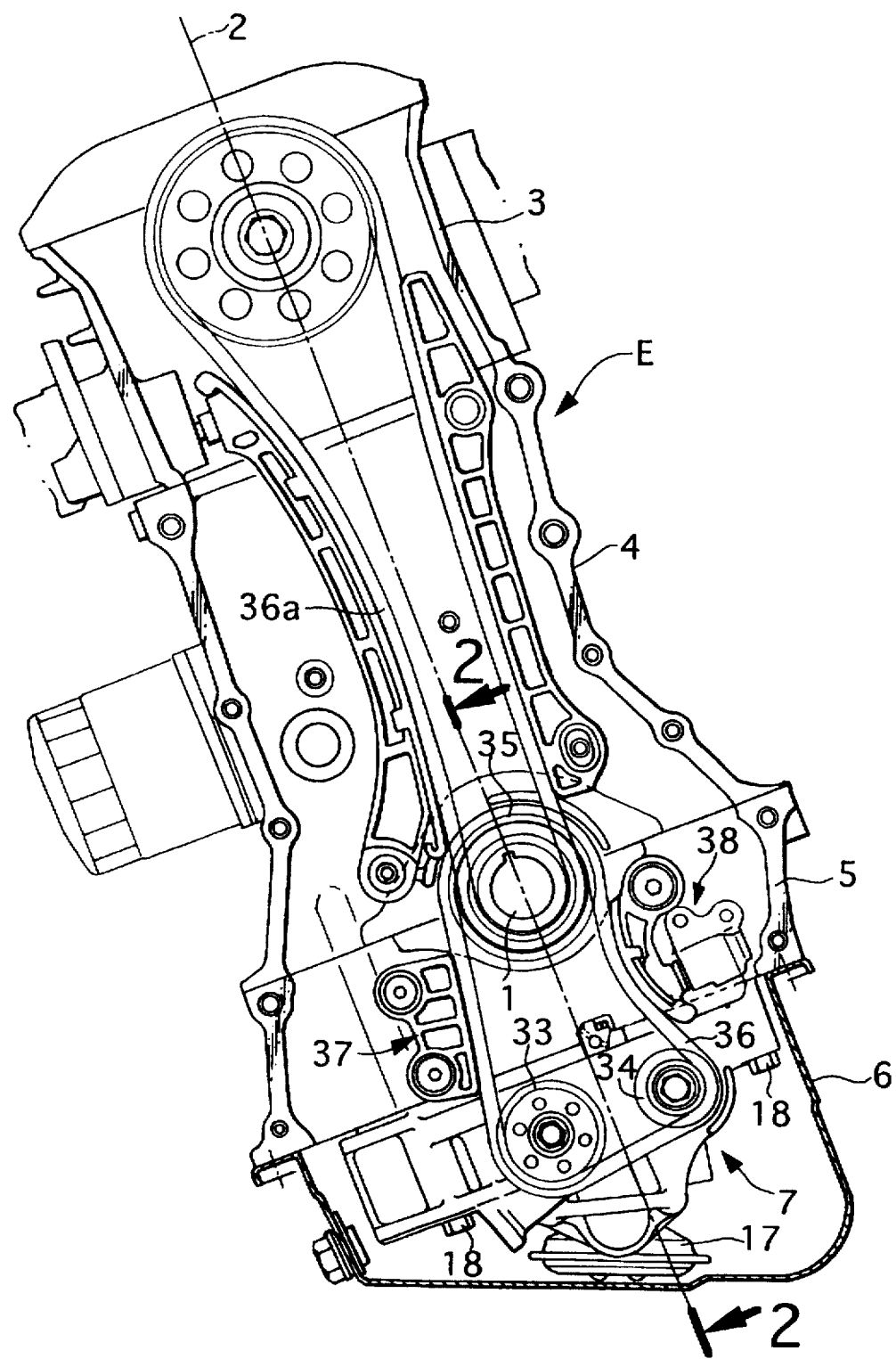
Figure 3:
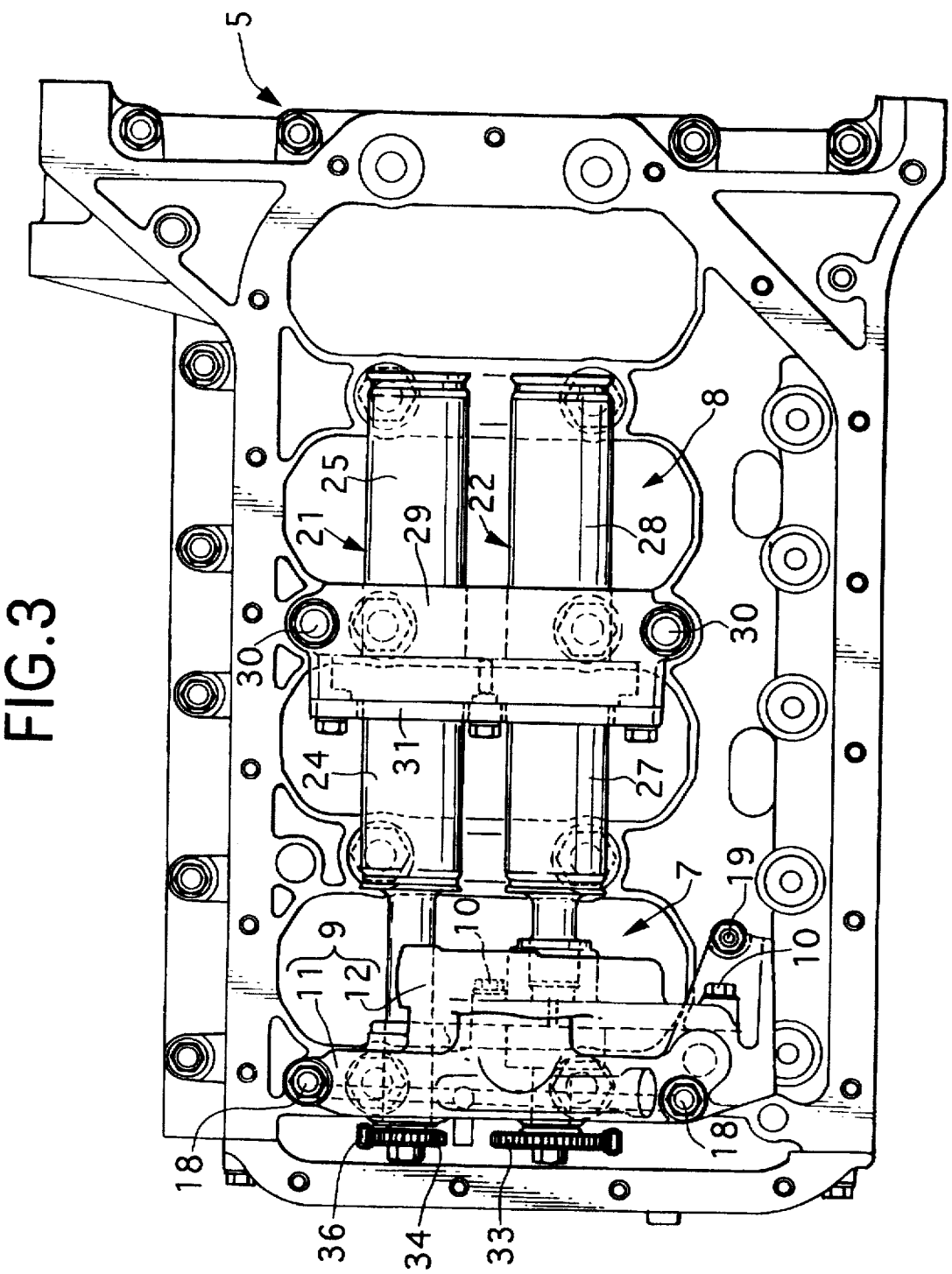

Referring to FIGS. 1 to 3, an engine E in the present embodiment is an in-line 4-cylinder engine which includes a crankshaft 1 disposed horizontally, and four cylinder axes 2 disposed substantially vertically. An engine body includes a cylinder head 3, a cylinder block 4 coupled to a lower surface of the cylinder head 3, a lower block 5 coupled to a lower surface of the cylinder block 4, and an oil pan 6 coupled to a lower surface of the lower block 5. #1, #2, #3,

4, and #5 journal portions $1_1$, $1_2$, $1_3$, $1_4$ and $1_5$ are clamped and rotatably supported between five journal support portions $4_1$, $4_2$, $4_3$, $4_4$, and $4_5$, formed on the lower surface of the cylinder block 4 and five journal support portions $5_1$, $5_2$, $5_3$, $5_4$ and $5_5$ formed on an upper surface of the lower block 5.

The lower surface of the lower block 5 is provided with an oil pump 7 comprised of a trochoidal pump and a secondary balancer device 8 for reducing the secondary vibration of the engine E. The oil pump 7 and the secondary balancer device 8 are immersed in an oil accumulated in the oil pan 6. The oil pan 6 has a depth at a location below the #1 journal portion $1_1$ larger than that at a location below the #4 journal portion $1_4$, which is convenient for disposition of the oil pump 7.

As can be seen from FIGS. 4 to 6, a pump housing 9 of the oil pump 7 coupled to a lower surface of the journal support portion $5_1$ of the lower block 5 is comprised of two members: a pump body 11 and a pump cover 12 which are integrally coupled to each other by five bolts 10. Six reinforcing ribs $12_{1a}$ and $12_{1b}$ project from a surface of the pump cover 12 opposite the pump body 11 (see FIG. 5). Not only the supporting rigidity for a rear balancer shaft 22, which will be described hereinafter, can be enhanced, but also a variation in oil level due to sloshing of the oil within the oil pan 6 can be suppressed, by the reinforcing ribs $12_{1a}$ and $12_{1b}$. Particularly, the supporting rigidity for the rear balancer shaft 22 can be remarkably enhanced by the five reinforcing ribs $12_{1a}$ radially formed on the journal support portions of the rear balancer shaft 22.

The pump body 11 includes an intake port $11_1$ which opens into a matting surface thereof to the pump cover 12, a discharge port $11_2$ and a pump chamber $11_3$. An inner rotor 15 meshed with an outer rotor 14 rotatably carried in the pump chamber $11_3$ is coupled to and driven by a pump shaft 16 rotatably carried in the pump body 11.

An oil strainer 17 is provided for filtering the oil within the oil pan 6 to supply the filtered oil to the intake port $1_1$ of the oil pump 7, and has a mounting flange $17_1$ which is fastened to the pump cover 12 by two of the five bolts 10 for coupling the pump cover 12 to the pump body 11. The oil discharged from the discharge port $11_2$ of the oil pump 7 is supplied through an oil passage $11_4$ to an oil gallery 13 (see FIG. 8) defined in the cylinder block 4 and then supplied therefrom as a lubricating oil to various portions of the engine E.

Thus, the oil pump 7 having the above-described construction is coupled to the lower surface of the lower block 5 by two bolts 18, 18 passing through the pump body 11 below the #1 journal portion $1_1$, and by a single bolt 19 passing through the pump body 11 below between the #1 and #2 journal portions $1_1$ and $1_2$, i.e., at a location offset toward a bracing journal portion $26_4$.

The secondary balancer device 8 includes a front balancer shaft 21 and a rear balancer shaft 22 which are rotated in opposite directions at twice the speed of the crankshaft 1. The front balancer shaft 21 is comprised of a shaft body 23 and a pair of cylindrical covers 24 and 25. The shaft body 23 includes a pair of balancer weight portions $23_1$ and $23_2$ eccentric from a rotational axis of the shaft body 23, a main journal portion $23_3$ formed between both the balancer weight portions $23_1$ and $23_2$, a bracing journal portion $23_4$ formed at one of axial ends, and a driving helical gear $23_5$ formed adjacently to the main journal portion $23_3$. The pair of cylindrical covers 24 and 25 are disposed coaxially with the rotational axis and fixed to the shaft body 23 so as to cover the pair of balancer weight portions $23_1$ and $23_2$.

The rear balancer shaft 22 is also comprised of a shaft body 26 and a pair of cylindrical covers 27 and 28, as is the front balancer shaft 21. The shaft body 26 includes a pair of balancer weight portions $26_1$ and $26_2$ eccentric from a rotational axis of the shaft body 26, a main journal portion $26_3$ formed between both the balancer weight portions $26_1$ and $26_2$, a bracing journal portion $26_4$ formed at one of axial ends, and a follower helical gear $26_5$ formed adjacently to the main journal portion $26_3$. The pair of cylindrical covers 27 and 28 are disposed coaxially with the rotational axis and fixed to the shaft body 26 to cover the pair of balancer weight portions $26_1$ and $26_2$.

By covering the balancer weight portions $23_1$, $23_2$; $26_1$ and $26_2$ with the cylindrical covers 24, 25; 27 and 28 in the above manner, the balancer weight portions $23_1$, $23_2$; $26_1$ and $26_2$ can be prevented from stirring the oil within the oil pan 6, thereby alleviating the rotational resistance of the front and rear balancer shafts 21 and 22.

As can be seen from FIG. 7, a balancer holder 29 made of an iron-based material is coupled to a lower surface of the journal supporting portion $5_3$ of the lower block 5 by two bolts 30, 30. The driving helical gear $23_5$ of the front balancer shaft 21 and the follower helical gear $26_5$ of the rear balancer shaft 22 are accommodated in a meshed relation within a gear chamber $29_1$ defined in a balancer holder 29. A thrust plate 31 for limiting the axial movement of the front and rear balancer shafts 21 and 22 is fixed to the balancer holder 29 by three bolts 32 to cover an opening in the gear chamber $29_1$. An oil releasing bore $31_1$ is defined in a central portion of the thrust plate 31, so that a hydraulic pressure generated within the gear chamber $29_1$ by meshing of the driving helical gear $23_5$ with the following helical gear $26_5$ is released through the oil releasing bore $3_1$.

The driving and follower helical gears $23_5$ and $26_5$ are provided between the main journal portions $23_3$ and $26_3$ and the bracing journal portions $23_4$ and $26_4$ of both the balancer shafts 21 and 22 and in proximity to the main journal portions $23_3$ and $26_3$, respectively, leading to a very good meshing accuracy. In addition, since the thrust plate 31 is formed from a single member and hence, a reduced number of parts are required, and it is easy to attach the thrust plate 31. The oil releasing bore $31_1$ is provided at a location where the pressure in the gear chamber $29_1$ is greater, and below the gear chamber $29_1$, which is convenient for releasing of the oil. Further, because the balancer holder 29 is made of the iron-based material having a small thermal coefficient of expansion, the variation in distance between axes of the balancer shafts 21 and 22 can be minimized, thereby preventing the generation of an abnormal sound due to a failure of meshing of the helical gears $23_5$ and $26_5$.

As can be seen from FIG. 4, the bracing journal portion $23_4$ of the front balancer shaft 21 is supported in a bearing bore $11_5$ defined in the pump body 11, and the bracing journal portion $26_4$ of the rear balancer shaft 22 is supported in a bearing bore $12_2$ defined in the pump cover 12. The pump shaft 16 of the oil pump 7 and the rear balancer shaft 22 are disposed coaxially with each other, and an oil chamber 123 is defined in the pump cover 12 to communicate with the axial end of the pump shaft 16 through an oil passage $12_4$, so that the axial end of the bracing journal portion $26_4$ (see FIG. 4) of the rear balancer shaft 22 faces the oil chamber $12_3$.

In this way, each of the balancer shafts 21 and 22 is supported at two places: first, at the lengthwise central main journal portion $23_3$, $26_3$ and second, at the bracing journal portion $23_4$, $26_4$ at the axial end, respectively. Hence, the vibration of both the balancer shafts 21 and 22 with the rotation can be reliably prevented. Moreover, since the bracing journal portion $26_4$ of the rear balancer shaft 22 is supported in the bearing bore $12_2$ in the pump cover 12, the length of the rear balancer shaft 22 is shortened and hence, the balancer shaft 22 can be supported in a more stable manner. Further, the pump body 11 is coupled to the lower surface of the lower block 5 by the bolt 19 at the location offset toward the bracing journal portion $26_4$, leading to a remarkably enhanced supporting rigidity for the rear balancer shaft 22.

Lubrication of the front and rear balancer shafts 21 and 22 supported on the balancer holder 29 will be described below with reference to FIGS. 8 to 10.

As shown in FIG. 8, the main gallery 13 defined in the cylinder block 4 in parallel to the crankshaft 1 is connected to an oil passage $4_7$ defined in a surface of the cylinder block 4 mated to the lower block 5 through an oil passage $4_8$ defined in the cylinder block 4. The cylinder block 4 and the lower block 5 are integrally coupled to each other by a plurality of bolts 51 and the two bolts 30, 30 for coupling the balancer holder 29 to the lower block 5. The oil passage $4_7$ in the mated surface of the cylinder block 4 communicates with lubricating oil passages $29_3$ and $29_4$ and $29_5$ defined in the balancer holder 29 through oil passages $5_6$ and $29_2$ defined between the lower block 5 as well as the balancer holder 29 and an outer periphery of one of the two bolts 30, 30. The oil passage $4_7$ in the mated surface of the cylinder block 4 also communicates with an oil channel $4_8$ surrounding a part of the #3 journal portion $1_3$ of the crankshaft 1 to lubricate the #3 journal portion $1_3$.

A bearing cap $61_3$ (see FIG. 8) made of an iron-based material is embedded in the lower block 5 made of an aluminum-based material, and the bearing cap $61_3$ and the balancer holder 29 made of the iron-based material are commonly clamped to the cylinder block 4 made of an aluminum-based material. Therefore, the weight of the lower block 5 can be reduced, and the supporting rigidity for the crankshaft 1 and both the balancer shafts 21 and 22 can be remarkably enhanced. Bolts 51, 51 for fixing the bearing cap $61_3$ made of the iron-based material in the vicinity of the crankshaft 1 and the bolts 30, 30 for fixing the bearing cap $61_3$ and the balancer holder 29 made of the iron-based material of portions outside of the bolts 51, 51 are disposed in parallel to each other. Moreover, an oil passage $4_6$ for lubricating the balancer shafts 21 and 22 are defined between both the bolts 51 and 30. Therefore, the cylinder block 4 and the lower block 5 can be formed in a compact manner.

As can be seen from FIG. 9, two bearings bores $29_6$ and $29_7$ are provided in the balancer holder 29 for mounting of a first bearing bushing $52_a$ and a second bearing bushing $52_b$ which support the front and rear balancer shafts 21 and 22, respectively. The lubricating oil passages $29_3$, $29_4$ and $29_5$ are cut from the right side to the left side in FIG. 9 by a single drill and extend through the two bearing bores $29_6$ and $29_7$ to the oil passage $29_2$ defined around the outer periphery of the bolt 30. Axes L of the lubricating oil passages $29_3$, $29_4$ and $29_5$ are oriented eccentrically upwards by a predetermined distance 8 from centers O, O of the bearing bores $29_6$ and $29_7$ (i.e., centers O, O of the front and rear balancer shafts 21 and 22).

Each of the first and second bearing bushings $52_a$ and $52_b$ mounted in the two bearing bores $29_6$ and $29_7$ in the balancer holder 29 is made of the same material and has a first oil bore $52_{a1}$, $52_{b1}$ and a second oil bore $52_{a2}$, $52_{b2}$ at locations spaced apart from each other by a center angle θ different from 180°, as shown in FIG. 10. Each of the first and second bearing bushings $52_a$ and $52_b$ has a notch $52_3$ defined in a side edge thereof, which is adapted to be engaged by a projection of a press-fit jig to limit the phase of the bearing bushings $52_a$ and $52_b$ when the bearing bushings $52_a$ and $52_b$ are press-fitted into the bearing bores $29_6$ and $29_7$.

The first upstream end-side bearing bushing $52_a$ mounted in the bearing bore $29_6$ to support the main journal portion $26_3$ of the rear balancer shaft 22 is disposed so that the first and second oil bores $52_{a1}$ and $52_{a2}$ defined therein communicate with the lubricating oil passages $29_3$ and $29_4$, respectively. The second downstream end-side bearing bushing $52_b$ mounted in the bearing bore $29_7$ to support the main journal portion $23_3$ of the front balancer shaft 21 is disposed so that the first oil bore $52_{b1}$ communicates with the lubricating oil passage $29_4$ and the second oil bore $52_{b2}$ is closed to keep out of the lubricating oil passage $29_5$. An annular oil channel $26_6$ is defined around the outer periphery of the main journal portion $26_3$ of the rear balancer shaft 22, and the two oil bores $52_{a1}$ and $52_{a2}$ in the first bearing bushing $52_a$ communicate with each other through the oil channel $26_6$. Because the annular oil channel $26_6$ is defined, the amount of lubricating oil supplied to the bearing bushing $52_b$ located at the downstream end can be assured.

As can be seen from FIGS. 1 and 4, a pump follower sprocket 33 and a balancer follower sprocket 34 are fixed to the axial end of the pump shaft 16 extending from the pump body 11 and the axial end of the front balancer shaft 21, respectively. Both sprockets 33 and 34 are connected through an endless chain 36 to a driving sprocket 35 fixed to the axial end of the crankshaft 1. A chain guide 37 is mounted on the tensioned side of the endless chain 36, and a hydraulic chain tensioner 38 is mounted on the loosened side of the endless chain 36.

The balancer follower sprocket 34 has one-half the number of teeth of the driving sprocket 35, and the pump follower sprocket 33 has a number of teeth which is different from the number of teeth of the balancer follower sprocket 34. It is preferable for performance of the oil pump 7 that the balancer follower sprocket 34 has a smaller number of teeth than the pump follower sprocket 33. The endless chain 36 for driving the oil pump 7 and the front balancer shaft 21 is disposed inside an endless chain 36a for driving a camshaft, namely, on the side of the #1 journal portion $1_1$ of the crankshaft 1.

The operation of the embodiment of the present invention having the above-described arrangement will be described below.

When the engine E is driven, the rotation of the crankshaft 1 is transmitted through the driving sprocket 35 and the endless chain 36 to the pump follower sprocket 33 and the balancer follower sprocket 34. Since the balancer follower sprocket 34 has one-half the number of teeth of the driving sprocket 35, the front balancer shafts 21 and the rear balancer shaft 22 connected to the front balancer shaft 21 through the driving helical gear $23_5$ and the follower helical gear $26_5$ having the same number of teeth are rotated in opposite directions at a speed twice that of the crankshaft 1 to alleviate the secondary vibration of the engine E. In addition, since the pump follower sprocket 33 has a number of teeth which is different from the number of teeth of the balancer follower sprocket 34, the pump shaft 16 is rotated at a speed different from the number of revolutions of the balancer shafts 21 and 22 (e.g., at a speed one-half the speed of the balancer shafts 21 and 22).

In this way, the pump shaft 16 and the rear balancer shaft 22 disposed below the cylinder block 4 are disposed coaxially in a separated manner and driven independently.

Therefore, the size of the oil pump 7 cannot be increased and moreover, not only the oil pump 7 and the rear balancer shaft 22 can be disposed in a compact manner below the cylinder block 4, but also the speed of the oil pump 7 can be set at a value unrelated to the speed of the rear balancer shaft 22 to maintain freedom of design. The pump shaft 16 and the rear balancer shaft 22 are not necessarily disposed exactly coaxially with each other, but if the reduction in size and design freedom of the engine E are taken into consideration, it is desirable that the pump shaft 16 and the rear balancer shaft 22 are disposed coaxially with each other, as in the embodiment.

As can be seen from FIG. 4, since the oil supply channel $12_5$ is defined in the surface of the pump cover 12 opposed to the pump shaft 16 and communicates at one end with the discharge port $11_2$ of the oil pump 7 and at the other end with the axial oil passage $12_4$ defined in the pump cover 12, the oil supplied from this discharge port $11_2$ through the oil supply channel $12_5$ is supplied via the axial oil passage $12_4$ to the oil chamber $12_3$ to lubricate the bracing journal portion $26_4$ of the rear balancer shaft 22 supported in the bearing bore $12_2$ connected to the oil chamber $12_3$. Because the oil passage $12_4$ is defined in the pump cover 12 in the above manner, the bracing journal portion $26_4$ of the rear balancer shaft 22 can be lubricated through the oil passage having a minimum length.

The rear balancer shaft 22 is biased in a direction of an arrow A in FIG. 4 by a reaction force received by the follower helical gear $26_5$ of the rear balancer shaft 22 from the driving helical gear $23_5$ of the front balancer shaft 21. However, the axial end of the bracing journal portion $26_4$ of the rear balancer shaft 22 is biased in a direction of an arrow B by a hydraulic pressure applied to the oil chamber $12_3$ through the oil supply channel $12_5$ and the axial oil passage $12_4$ defined in the pump cover 12 and hence, the movement of the rear balancer shaft 22 in the thrust direction can be restrained to prevent abnormal sound generation.

Now, the oil supplied from the oil pump 7 to the main gallery 13 in the cylinder block 4 is supplied via the oil passages $4_6$ and $4_7$ in the cylinder block 4, the oil passage $5_6$ in the lower block 5 and the oil passage $29_2$ in the balancer holder 29 to the lubricating oil passage $29_3$ in the balancer holder 29. The oil supplied to the lubricating oil passage $29_3$ passes through the first oil bore $52_{a1}$ in the first bearing bushing $52_a$ of the rear balancer shaft 22 to lubricate the main journal portion $26_3$ of the rear balancer shaft 22. Such oil is supplied through the oil channel $26_6$ defined in the main journal portion $26_3$ and the second oil bore $52_{a2}$ in the first bearing bushing $52_a$ to the lubricating oil passage $29_4$ in the balancer holder 29. The oil supplied to the lubricating oil passage $29_4$ passes through the first oil bore $52_{b1}$ in the second bearing bushing $52_{b2}$ of the front balancer shaft 21 to lubricate the main journal portion $23_3$ of the front balancer shaft 21.

At this time, the oil which has lubricated the main journal portion $23_3$ of the front balancer shaft 21 is prevented from entering the lubricating oil passage $29_5$, because the second oil bore $52_{b2}$ in the second bearing bushing $52_b$ of the front balancer shaft 21 is closed to keep out of the lubricating oil passage $29_5$ in the balancer holder 29, as can be seen from FIG. 9. Even if the same material is used for the first bearing bushing $52_a$ of the front balancer shaft 21 and the second bearing bushing $52_b$ of the rear balancer shaft 22 to reduce the number of types of parts, the end opening of the lubricating passage $29_5$ need not be occluded by a special member such as a blind plug, which can contribute to a reduction in the number of parts.

In addition, since the oil passages $5_6$ and $29_2$ for guiding the oil to the lubricating oil passages $29_3$ to $29_5$ are made utilizing the bolt bores in the bolts 30 for coupling the lower block 5 and the balancer holder 29 to the cylinder block 4, the oil passages $5_6$ and $29_2$ can be easily made. Moreover, since the lubricating oil passages $29_3$ to $29_5$ in the balancer holder 29 are defined offset above the centers O, O of the bearing bores $29_6$ and $29_7$ (on the side of the lower block 5), the length of the oil passage $29_2$ in the balancer holder 29 can be shortened to the minimum, but also the positions of the seating faces of the bolts 30, 30 can be shifted upwards to contribute to the reduction in size of the engine E. This is convenient particularly when the rear side of the oil pan 6 (below the rear balancer shaft 22) is shallower than the front side of the oil pan 6 (below the front balancer shaft 21), as shown in FIG. 1.

In the embodiment shown in FIG. 9, all of the three oil bores $52_{a1}$, $52_{a2}$ and $52_{b1}$ in the bearing bushings $52_a$ and $52_b$ open into the lubricating oil passages $29_3$ and $29_4$ and hence, it is unnecessary to enlarge the oil bores $52_{a1}$, $52_{a2}$ and $52_{b1}$ more than required. Thus, the sizes of the oil bores $52_{a1}$, $52_{a2}$ and $52_{b1}$ can be set depending upon the amount of the lubricating oil, while a sufficient rigidity of the oil bushings $52_a$, $52_b$ is assured, thereby enhancing the freedom of design.

FIG. 11 illustrates a second embodiment of the present invention. In this second embodiment, lubricating oil passages $29_3$ to $29_5$ in the balancer holder 29 are defined offset above the centers O, O of the bearing $29_6$ and $29_7$, and first oil bores $52_{a1}$ and $52_{b1}$ and second oil bores $52_{a2}$ and $52_{b2}$ defined respectively in two bearing bushings $52_a$ and $52_b$ made of the same material have a center angle equal to 180°. Even with the second embodiment, a function and effect similar to those in the first embodiment can be provided by the fact that the two oil bores $52_{a1}$ and $52_{a2}$ in the first bearing bushing $52_a$ of the rear balancer shaft 22 communicate with the lubricating oil passages $29_3$ and $29_4$; the first oil bore $52_{b1}$ in the second bearing bushing $52_b$ of the front balancer shaft 21 communicates with the lubricating oil passage $29_4$, and the second oil bore $52_{b2}$ is closed to keep out of the lubricating oil passage $29_5$. Moreover, since the center angle θ formed by the first and second oil bores $52_{a1}$, $52_{b1}$ and $52_{a2}$, $52_{b2}$ in the bearing bushings $52_a$ and $52_b$ is 180°, it is easy to cut the oil bores $52_{a1}$, $52_{b1}$, $52_{a2}$ and $52_{b2}$.

FIG. 12 illustrates a third embodiment of the present invention. In the third embodiment, lubricating oil passages $29_3$ to $29_5$ in the balancer holder 29 are defined to extend through the centers O, O of the bearing bores $29_6$ and $29_7$, and first and second oil bores $52_{a1}$, $52_{b1}$ and $52_{a2}$, $52_{b2}$ defined in two bearing bushings $52_a$ and $52_b$ made of the same material have a center angle θ different from 180°. Even with the third embodiment, a function and an effect similar to those in the first embodiment can be provided by the fact that the two oil bores $52_{a1}$ and $52_{a2}$ in the first bearing bushings $52_a$ of the rear balancer shaft 22 communicate with the lubricating oil passages $29_3$ and $29_4$; the first oil bore $52_{b1}$ in the second bearing bushing $52_b$ of the front balancer shaft 21 communicates with the lubricating passage $29_4$, and the second oil bore $52_{b2}$ is closed to keep out of the lubricating oil passage $29_5$. Moreover, since the lubricating oil passages $29_3$ to $29_5$ extend through the centers O, O of the bearing bores $29_6$ and $29_7$, it is easy to cut the lubricating oil passages $29_3$ to $29_5$.

Although the embodiments of the present invention have been described in detail, it will be understood that the present invention is not limited to the above-described embodiments, and various modifications may be made without departing from the spirit and scope of the invention defined in the claims.

For example, the structure for lubricating the balancer shafts 21 and 22 has been described and illustrated in the embodiments, but the present invention is applicable to the lubricating of any other shafts and moreover, the number of such shafts may be three or more.

What is claimed is:

1. A rotary shaft lubricating structure for lubricating a plurality of rotary shafts by supplying oil from an upstream side to a downstream side of a lubricating oil passage defined in a bearing block, comprising:

a plurality of bearing bores, said lubricating oil passage passing through said plurality of bearing bores; and a plurality of annular bearing members, said rotary shafts being supported respectively in said plurality of annular bearing members which have first and second oil bores spaced apart from one another through a predetermined angle and which are fixed in said plurality of bearing bores defined in the bearing block, wherein said first and second oil bores in the bearing members excluding a downstream end-side bearing member located at a downstream end in an oil supplying direction open into said lubricating oil passage, wherein an upstream-side one of the oil bores in said downstream end-side bearing member opens into said lubricating oil passage, and wherein a downstream-side one of the oil bores of the said downstream end-side bearing member is closed by said bearing block to keep out of said lubricating oil passage.

2. A rotary shaft lubricating structure according to claim 1, wherein said bearing block is coupled by a bolt to a body block having an oil passage for supplying the oil to said lubricating oil passage, wherein another oil passage is defined around an outer periphery of a bolt bore, through which said bolt is inserted, to communicate with said lubricating oil passage in said bearing block, and wherein said lubricating oil passage in said bearing block is defined offset from the center of said bearing bore toward said body block.

3. A rotary shaft lubricating structure according to claim 2, wherein said first and second oil bores are spaced apart from each other through an angle other than 180°.

4. A rotary shaft lubricating structure according to claim 2, wherein said first and second oil bores are spaced apart from each other through an angle equal to 180°.

5. A rotary shaft lubricating structure according to claim 1, wherein said bearing block is coupled by a bolt to a body block having an oil passage for supplying the oil to said lubricating oil passage, wherein an oil passage is defined around an outer periphery of a bolt bore, through which said bolt is inserted, so as to communicate with said lubricating oil passage in said bearing block, wherein said lubricating oil passage in said bearing block is defined to extend through the center of said bearing bore, and wherein said first and second oil bores are spaced apart from each other through an angle other than 180°.

6. A rotary shaft lubricating structure according to claim 1, wherein said bearing block comprises a balancer shaft support member coupled to a lower surface of a cylinder block of an engine through a lower block, wherein at least one of said rotary shafts comprises a balancer shaft supported on said balancer shaft support member, wherein said lower block having a bearing cap for supporting a journal portion of a crankshaft is placed into abutment against opposite sidewalls of said cylinder block, said balancer shaft support member being placed into abutment against a lower surface of said lower block, said lower block and said balancer shaft support member being commonly clamped to said cylinder block by a common bolt, and wherein a bore through which said bolt is inserted is utilized as an oil passage for supplying the oil to said lubricating oil passage.

7. A rotary shaft lubricating structure according to claim 6, wherein said lubricating oil passage is defined offset from the center of said bearing bore toward said lower block.

8. A rotary shaft lubricating structure according to claim 1, wherein said bearing block comprises a balancer shaft support member coupled to a lower surface of the cylinder block of an engine through a lower block, wherein at least one of said rotary shafts comprises a balancer shaft supported on said balancer shaft support member, wherein said lower block is made of an aluminum-based material and includes a bearing cap made of an iron-based material and embedded therein for supporting a journal portion of a crankshaft, wherein said lower block is fixed to opposite sidewalls of said cylinder block which is made of an aluminum-based material, wherein said balancer shaft support member is fixed to a lower surface of said lower block, and wherein an oil passage for supplying the oil to the journal portion of the crankshaft is defined in a surface of said cylinder block to which said lower block is coupled and which is opposed to said bearing cap, said oil passage diverging from an oil passage for supplying the oil to said lubricating oil passage in said balancer shaft support member.

9. A rotary shaft lubricating structure according to claim 8, wherein said lubricating oil passage is defined offset from the center of said bearing bore toward said lower block.

* * * * *